JOHN T. BRITTAIN.
Improvement in Cultivators.

No. 120,028. Patented Oct. 17, 1871.

UNITED STATES PATENT OFFICE.

JOHN T. BRITTAIN, OF SPRINGFIELD, OHIO.

IMPROVEMENT IN CULTIVATORS.

Specification forming part of Letters Patent No. 120,028, dated October 17, 1871.

*To all whom it may concern:*

Be it known that I, JOHN T. BRITTAIN, of Springfield, in the county of Summit and State of Ohio, have invented certain Improvements in Farm and Garden-Cultivators, of which the following is a specification:

My invention relates to improvements in the different parts of the cultivator, securing at once cheapness, strength, durability, lightness, ease of draft and handling, and facility and economy of construction and repair in any or all of its parts. It consists of three iron beams of equal length, shape, weight, and strength, bent in such manner as to form at once beam and stem in each, upon which are bolted three shovel-plows or feet, with iron handles so attached as to dispense with other braces, the whole put together with bolts and nuts, without eyelets, wedges, mortises, tenons, clasps, or rivets in any part, and capable of being put together or detached with a common wrench, so as entirely to separate any part from the others for the purpose of repairing or supplying it anew; also, an adjusting-bar with corresponding attachments, allowing the feet to be set at varying widths for convenience and thoroughness in cultivation.

Figure 1:
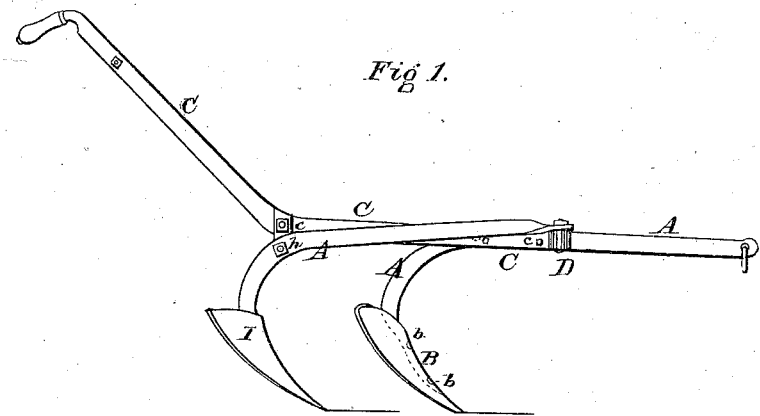
Figure 2:
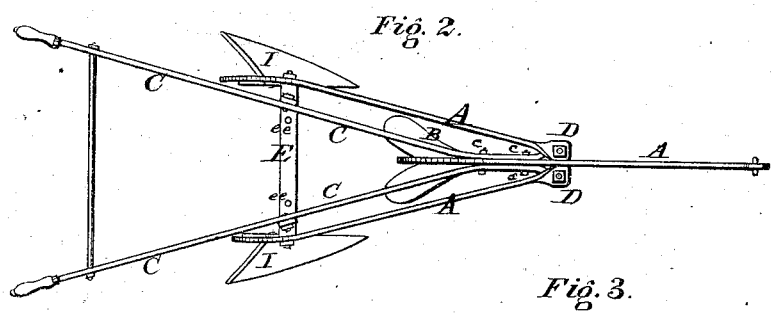
Figures 3, 4:
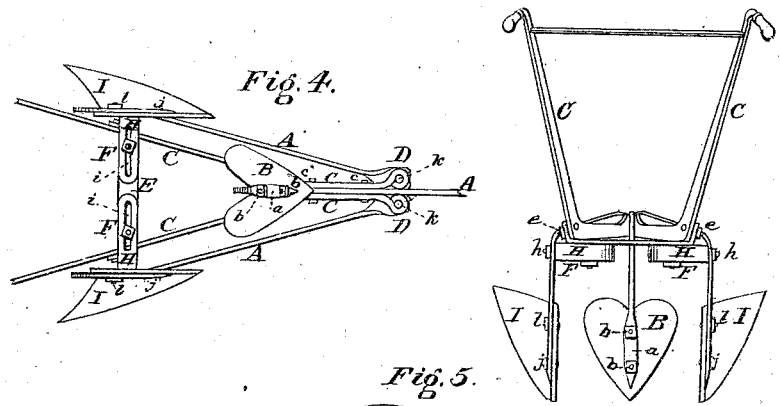
Figure 5:
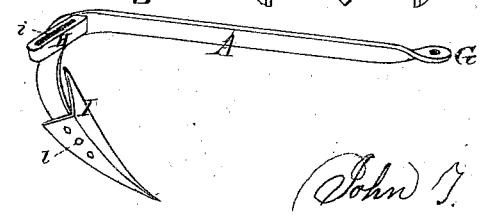

Figure 1 is a perspective view of one side of the cultivator. Fig. 2 is a top view of the same. Fig. 3 is a rear view. Fig. 4 is a bottom view. Fig. 5 is a perspective view of side beam, showing inside of same with attachments.

The beams A are of tire-iron, and may be of any size—that for common use being one-half to five-eighths of an inch in thickness and one and three-fourths to two inches in width, of suitable length for securing the proper size for the cultivator. These beams are bent to form the stems or standards, as shown in the accompanying drawing. The forward beam has an ordinary hook or link at the fore end for attaching the whiffletree or draft-chain. This beam, being bent as shown, is so shaped at the toe *a* as to fit the inside angle of the forward shovel or foot B, which is made in form of a double mold-board shovel-plow struck from a plate of plow steel, and formed with the hammer over a molder or former. This shovel is more pointed and sharper than the ordinary cast shovel-plow, and struck at a sharper angle, with more curve of the point and greater fall of the wings, which results are easily obtained by the use of plow-steel under the hammer. The shovel is fastened by two plow-bolts, *b*, countersunk, and passing through the plate B and the toe *a*, fastening by nuts at the back, as shown in Figs. 1, 3, and 4. The nuts are protected from wear or loosening by the cavity of the furrow. The beams are slightly drawn toward the extremities and thickened by upsetting at the curve, so as to give them proportionate strength and elegance of form. Upon the front beam, a little over half-way from the fore end to the curve, the forward extremities of the handles C are laid flat against the sides, running back to the curve, and securely bolted by two bolts and nuts, *c*, fastening the three bars (beam and handles) firmly together. Short carriage-bolts are proper for this purpose. The forward end of each handle is looped to form a hole, *k*, for the passage of a perpendicular bolt, as shown in Fig. 4, forming part of the hinge D. At the curve of the beam the handles diverge, by being slightly bent outward, and run back to a point where the rear or side beams begin to curve to form the hind feet of the cultivator. At this point they are connected by a flat bar, E, passing horizontally across on the under side and turned up at right angles upon the outside of the handles. A small bolt and nut, *e*, fasten each handle to the end of the bar, as in Figs. 1, 2, and 3. Through the bar E, a short distance from each handle, a hole, *e e*, is drilled (Fig. 2) for a perpendicular bolt, forming part of the adjustment F. Back of this bar the handles are bent upward at a regular convenient angle, and run back to the hand, being connected near the top by a cross-rod fastened by a nut at each end. The handle-tips are drawn to a wire, and pass through short handles of wood turned to fit the hand, fastened by nuts at the extremities. The peculiar construction of the handles C and bar E uniting with the beams A combines to render the cultivator perfectly firm, light, and strong, and supersedes entirely the necessity for the frames, braces, mortises, eyelets, clasps, rivets, or wedges used in ordinary implements. The side beams, two in number, are, as above stated, of equal size and shape with the front beam, differing only in slight particulars for the attachments of the remaining parts. The front end of each is given a short half twist, G, Fig. 5, and drilled for a perpendicular bolt passing downward through this and the loop *k*, and fastened by a nut on the under side, forming the hinge D. This whole arrangement is clearly shown by reference to Figs. 1, 2, 4, and 5. Near the top of the curve in each side beam a hole is drilled, in which is inserted, at right angles from the inner side, the end of a short horizontal bar, H, firmly fastened on the outside by a nut, h. This bar fits with a shoulder against the inside of the beam. Through the bar H a slot, i, is cut several inches in length, of proper diameter to fit the bolt passing downward through the horizontal bar E at the point e e, Fig. 2. Upon this bolt the slot i is made to slide by loosening the strong nut fastening the bolt upon the under side, and the beams A may thus be set at any desired width, carrying with them the rear shovels, plows, or feet I, as may be seen by Figs. 1, 2, 3, 4, and 5, the hinge D allowing the side beams to swing outward, and combining with the adjustment F, adapting the implement to either field or garden use. The rear feet I are formed by cutting a square plate of plow-steel diagonally from corner to corner, each square making two of the plows. From a point about one-fourth the distance from the right to the acute angle a line is indicated to the third angle. Upon this line the sheet is bent upon the molder to an angle slightly acute, forming a land-side of the triangular strip turned downward, the residue forming the mold-board of a small solid plow, the whole being properly curved, drawn, and sharpened by the hammer to conform to the proportions of the forward double mold-board shovel upon the front beam. The side plows I are thus made "right and left," and are so fitted as to be changed to either beam at will, turning the furrows either toward or from the rows between which the implement is run. Each foot I is attached to the toe j of the side beam by a horizontal bolt, l, countersunk at the head, passing through the land-side, and fastened by a nut on the inside of the toe j, which is fitted nicely into the angle of the plow I, and rests firmly against the land-side, as shown by Figs. 1, 3, and 5.

These side beams A, with the plows I, may be entirely detached and removed, and the residue of the machine will then form and constitute a complete and convenient shovel-plow, ready for use for any and all purposes of such implement.

I claim as my invention—

1. The frame of the cultivator, when constructed of flat tire-iron, as herein described, by combination of the handles C with the bent front and side beams A by means of the bolts c and the hinges D, and again with the side beams A by means of the connecting-bar E, the short bars H, and the adjustment F, substantially as and for the purposes hereinbefore set forth.

2. The herein-described construction of the two solid land-side rear plows I from a single square plate of metal without any waste of material, so as to make each plow adjustable and reversible right or left, formed from a right-angled triangle without casting or forging, in combination with the said described frame, substantially as hereinbefore set forth.

JOHN T. BRITTAIN.

Witnesses:
  CHAS. H. POOLE,
  A. F. DINSMORE. (43)